(12) United States Patent
Xu et al.

(10) Patent No.: US 12,240,506 B2
(45) Date of Patent: Mar. 4, 2025

(54) TRAIN INTEGRITY DETECTION SYSTEM BASED ON BEIDOU SHORT MESSAGE COMMUNICATION

(71) Applicant: CASCO SIGNAL LTD., Shanghai (CN)

(72) Inventors: Xianliang Xu, Shanghai (CN); Xiaoguang Li, Shanghai (CN); Hao Wang, Shanghai (CN); Dening Cao, Shanghai (CN); Jun Chen, Shanghai (CN); Shuyang Dong, Shanghai (CN); Hongjun Jiang, Shanghai (CN); Fengwei Yang, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 174 days.

(21) Appl. No.: 18/005,480

(22) PCT Filed: Sep. 23, 2021

(86) PCT No.: PCT/CN2021/119767
§ 371 (c)(1),
(2) Date: Jan. 13, 2023

(87) PCT Pub. No.: WO2022/121438
PCT Pub. Date: Jun. 16, 2022

(65) Prior Publication Data
US 2023/0271636 A1    Aug. 31, 2023

(30) Foreign Application Priority Data
Dec. 10, 2020   (CN) .......................... 202011436058.2

(51) Int. Cl.
*B61L 15/00* (2006.01)
*B61L 25/02* (2006.01)
*B61L 27/70* (2022.01)

(52) U.S. Cl.
CPC ....... *B61L 15/0054* (2013.01); *B61L 15/0027* (2013.01); *B61L 25/025* (2013.01); *B61L 27/70* (2022.01); *B61L 2205/04* (2013.01)

(58) Field of Classification Search
CPC ............ B61L 15/0054; B61L 15/0027; B61L 25/025; B61L 27/70; B61L 2205/04;
(Continued)

(56) References Cited

U.S. PATENT DOCUMENTS

2023/0271636 A1* 8/2023 Xu ...................... B61L 15/0027
701/19

FOREIGN PATENT DOCUMENTS

| CN | 102608638 A | * | 7/2012 |
| CN | 107310591 A | | 11/2017 |

(Continued)

OTHER PUBLICATIONS

He Yongfa, Jun. 14, 2019, English Machine Translation_ CN208978874U provided by Patent Translate by EPO and Google (Year: 2019).*

(Continued)

*Primary Examiner* — Peter D Nolan
*Assistant Examiner* — Ashley L Redhead, Jr.
(74) *Attorney, Agent, or Firm* — HSML P. C.

(57) ABSTRACT

The invention relates to a train integrity detection system based on Beidou short message communication, which comprises a vehicle-mounted ATP host, a train rear device and a ground RBC device, wherein the vehicle-mounted ATP host communicates with both the train rear device and the ground RBC device, the vehicle-mounted ATP host and the train rear device each comprise a main control unit, and a wind pressure detection module, a wireless communication module, a speed measurement module and a satellite positioning module which are connected with the main control unit, and the vehicle-mounted ATP host and the train rear device also each comprise a Beidou short message communication module connected with the main control unit. Compared with the prior art, the invention has the advantages of strong communication jamming resistance and short response time.

9 Claims, 1 Drawing Sheet

(58) Field of Classification Search
CPC ............. B61L 2205/02; B61L 15/0018; B61L 2205/00; Y02D 30/70
See application file for complete search history.

(56) References Cited

FOREIGN PATENT DOCUMENTS

| | | | |
|---|---|---|---|
| CN | 207015356 U | | 2/2018 |
| CN | 208978874 U | * | 6/2019 |
| CN | 112550364 A | | 3/2021 |
| CN | 213718226 U | | 7/2021 |
| KR | 20160044662 A | | 4/2016 |

OTHER PUBLICATIONS

Qang Sun, Mar. 28, 2012, English Machine Translation_ CN102608638A provided by Patent Translate by EPO and Google (Year: 2012).*
International Search Report (with English translation) and Written Opinion issued in PCT/CN2021/119767, dated Nov. 25, 2021, 12 pages provided.
Xiao, "Cargo train integrity safety assurance system based on Beidou satellite", Retarders & Speed Control Technology, No. 2, Dec. 31, 2017, with English translation, cited in ISR.

* cited by examiner

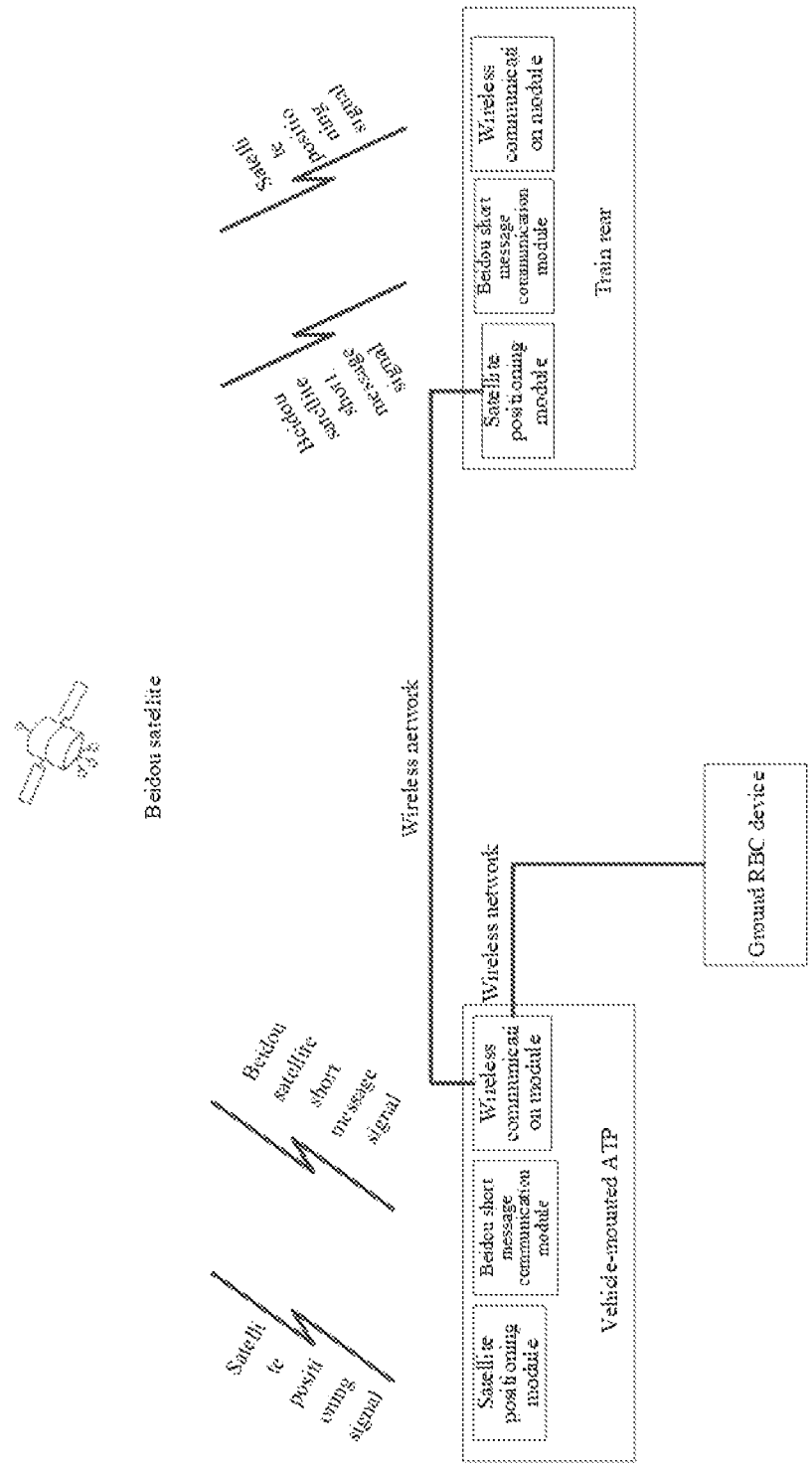

TRAIN INTEGRITY DETECTION SYSTEM BASED ON BEIDOU SHORT MESSAGE COMMUNICATION

BACKGROUND OF THE INVENTION

1. Technical Field

The invention relates to train integrity detection systems, in particular to a train integrity detection system based on Beidou short message communication.

2. Description of Related Art

In a train control system, train integrity monitoring plays an important role in ensuring driving safety. In order to prevent a train from being decoupled during running, a train rear device is needed to check the integrity of the train. The train rear device is usually used for freight trains, which can realize train rear unattendance. The wind pressure at the rear of the train can be automatically collected and transmitted to a control box located in an operator cab, so as to provide the basis for integrity determination.

It is found through searching that Chinese Patent No. CN107310591A discloses a method, device and system for detecting train integrity. The method comprises: acquiring train positioning data and train rear wind pressure data, and determining whether a train is complete or not according to the train positioning data and the train rear wind pressure data. According to the train positioning data and train rear wind pressure data acquired in real time, the invention can accurately and effectively determine whether the train is complete, so as to effectively reduce the labor intensity of drivers and crews while improving the operation efficiency of freight trains and the driving safety factor, which conforms to the development direction of heavy load and high density of freight railways.

However, in a novel train control system used for the Qinghai-Tibet line, train integrity detection has become part of automatic protection of a train. The control box in the existing train rear device is canceled, and the wind pressure data are transmitted to a vehicle-mounted ATP host. Specifically, a novel train rear device realizes two-way information transmission with vehicle equipment through the GPRS wireless network packet data service, and outputs reliable train rear wind pressure values, train position and speed information and alarm information. The Qinghai-Tibet Railway runs from Xining Station to Lhasa Station, featuring a long line, high altitude and harsh environment. The train rear device using wireless network communication has a high requirement for reliability, and has a complex structure and many fault points, but maintenance of equipment is difficult on the Qinghai-Tibet line. Once train integrity is lost, operation efficiency will be impacted a lot.

BRIEF SUMMARY OF THE INVENTION

In order to overcome the defects of the prior art, the invention provides a train integrity detection system based on Beidou short message communication, which can determine whether a train is complete in a harsh environment.

The purpose of the invention can be realized by the following technical scheme.

According to one aspect of the invention, a train integrity detection system based on Beidou short message communication is provided, which comprises a vehicle-mounted ATP host, a train rear device and a ground RBC device, wherein the vehicle-mounted ATP host communicates with both the train rear device and the ground RBC device, the vehicle-mounted ATP host and the train rear device each comprise a main control unit, and a wind pressure detection module, a wireless communication module, a speed measurement module and a satellite positioning module which are connected with the main control unit, and the vehicle-mounted ATP host and the train rear device also each comprise a Beidou short message communication module connected with the main control unit.

As a preferred technical scheme, the Beidou short message communication module has the functions of active positioning and short message communication, and can realize the integration of positioning and communication.

As a preferred technical scheme, the active positioning function of the Beidou short message communication module is realized by sending a positioning application signal to a Beidou short message satellite and then receiving positioning information returned by the satellite.

As a preferred technical scheme, the active positioning function results in a high positioning speed, the positioning information can be obtained within 3 seconds, and positioning accuracy is within 100 m.

As a preferred technical scheme, the short message communication function of the Beidou short message communication module can be used as a backup of the wireless communication module, and the active positioning function can be used as a backup of the satellite positioning module.

As a preferred technical scheme, when the wireless communication module is unavailable, the train rear device transmits data through a short message of the Beidou short message communication module.

As a preferred technical scheme, when the short message data are used to determine whether a train is complete, a minimum safe rear end of the train is updated slowly, a determination method adopted by the vehicle-mounted ATP host should be different from that of using the wireless communication module, and reporting to the ground RBC device is needed.

As a preferred technical scheme, the train rear device sends wireless communication data and short message data at the same time, together with active positioning and passive positioning data.

As a preferred technical scheme, when a passive positioning error becomes larger, the vehicle-mounted ATP host compares the active positioning data with passive positioning, increases a threshold to determine whether a train is complete, and reports to the ground RBC device.

As a preferred technical scheme, the Beidou short message module is added to the train rear device, which is used to realize train rear information transmission and position acquisition when two fault points, that is, the wireless communication module and the satellite positioning module, fail.

Compared with the prior art, the invention has the following advantages.

1. The invention can stably output wind pressure and satellite positioning data of the rear of a train, and the vehicle-mounted ATP can adopt different methods to determine whether the rear of a train is complete according to different data sources, so that the integrity will not be lost due to the external environment, lockdown can be avoided, and operation efficiency will not be affected.

2. The invention has strong communication jamming resistance, can ensure communication under extreme weather conditions, and can transmit data through short messages when the GSM-R/GPRS wireless network cannot work normally.

3. The invention has the advantages of short response time, short point-to-point communication delay, wide coverage and high reliability, realizes data transmission between the rear of a train and the vehicle-mounted ATP host through little device investment, and meets the requirements for train integrity detection.

4. The Beidou short message module of the invention has the advantages of low power at the transmission moment, short duration at the transmission moment, low transmission frequency and low power consumption, and can be well compatible with the existing scheme so as to improve usability.

BRIEF DESCRIPTION OF THE SEVERAL VIEWS OF THE DRAWINGS

FIG. 1 is a structural diagram of the invention.

DETAILED DESCRIPTION OF THE INVENTION

Hereinafter, the technical scheme in the embodiments of the invention will be described clearly and completely with reference to the drawings in the embodiments of the invention. Obviously, the described embodiments are only part of the embodiments of the invention, not all of the embodiments. Based on the embodiments of the invention, all other embodiments obtained by those of ordinary skill in the art without creative labor are within the scope of the invention.

As shown in FIG. 1, a train integrity detection system based on Beidou short message communication comprises a vehicle-mounted ATP host, a train rear device and a ground RBC device, wherein the vehicle-mounted ATP host communicates with both the train rear device and the ground RBC device, the vehicle-mounted ATP host and the train rear device each comprise a main control unit, and a wind pressure detection module, a wireless communication module, a speed measurement module and a satellite positioning module which are connected with the main control unit, and the vehicle-mounted ATP host and the train rear device also each comprise a Beidou short message communication module connected with the main control unit.

The vehicle-mounted ATP host periodically checks train rear information and compares the same with its own wind pressure, position and speed to obtain a train integrity status.

The invention adds the Beidou short message communication module to the safety train rear device. This module has the functions of active positioning and short message communication, and can realize the integration of positioning and communication.

The communication function of the Beidou short message communication module is realized through satellite transfer. A source user terminal sends a short message to a satellite, and the satellite directly sends the same to a destination user terminal. At present, the short message communication function is subjected to an interaction frequency limit of one packet per minute and a transmission data size limit of 120 bytes. A train rear information data size meets the short message information amount limit, and does not affect data transmission. In a novel train control system used for the Qinghai-Tibet line, controlled trains are mainly locomotives, with the highest speed of 120 km/h. Under the condition of only short message communication, the maximum distance between a minimum safe rear end and a maximum safe front end from one train integrity check to the next train integrity check is 2000 m, which has little impact on driving efficiency.

The positioning function of the Beidou short message communication module is realized by sending a positioning application signal to a Beidou short message satellite and then receiving positioning information returned by the satellite. The active positioning function results in a high positioning speed, the positioning information can be obtained within 3 seconds, and positioning accuracy is within 100 m. The communication function of the Beidou short message communication module can be used as a backup of the wireless communication module, and the active positioning function can be used as a backup of the satellite positioning module.

The vehicle-mounted ATP host and the train rear device are each equipped with one Beidou short message communication module, which has two functions: wireless network communication and short message communication. The train rear device can send wireless communication data and short message data at the same time, together with active positioning and passive positioning data.

In the existing scheme, a failure of the wireless communication module of the train rear device or weak wireless network signals may cause the communication between the train rear device and the vehicle-mounted ATP host to be disconnected, so the vehicle-mounted ATP host cannot get the train rear information through a wireless network, and after a while, communication time is over, reconnection to the rear of a train fails, resulting in the loss of train integrity. After receiving an integrity loss report, the ground RBC device locks the line down from a position where the train is complete according to the fail-safe principle, so as to stop subsequent trains from entering the area. If the restoration of wireless communication fails, the line may be paralyzed.

According to the invention, when wireless communication is unavailable, the train rear device transmits data through a short message. Due to the difference in positioning accuracy and communication frequency, when short message data are used to determine whether a train is complete, a minimum safe rear end of the train is updated slowly, a determination method adopted by the vehicle-mounted ATP host should be different from that of using wireless communication, and reporting to the ground RBC device is needed.

In the existing scheme, a small satellite searching number and differential data delay of the satellite positioning module of the train rear device will lead to a large passive positioning error, and module failures will lead to the loss of passive positioning data. In the invention, there are two levels of positioning data errors for the vehicle-mounted ATP host: passive positioning error and active positioning error, and there are two thresholds for a difference between the distance between the head and rear of the train and the length of the train. When passive location is normal, the error is small and the threshold is small. When the passive positioning error becomes larger, the vehicle-mounted ATP host compares the active positioning data with passive positioning, increases the threshold to determine whether the train is complete, and reports to the ground RBC device.

Therefore, according to the invention, the Beidou short message module is added to the train rear device, which is used to realize train rear information transmission and position acquisition when two fault points, that is, the wireless communication module and the satellite positioning module, fail, so as to ensure normal operation of subsequent trains, and solve the problem of signal loss under the condition of unstable wireless communication signals.

When the train is running, secure communication is established between the vehicle-mounted ATP host and the train rear device, and reliable wind pressure, satellite positioning and speed information is reported according to the request of the vehicle-mounted ATP host. At the same time, the wind pressure, the satellite positioning information of the satellite positioning module, and the satellite positioning information and speed of active positioning are reported through the short message function.

After receiving the data of wireless communication, the vehicle-mounted ATP host takes the data as the integrity determination basis and reports the data to the ground device.

When the vehicle-mounted ATP host cannot receive the data of wireless communication, the vehicle-mounted ATP host uses the data obtained by short messages as the integrity determination basis, reports the data to the ground device, and indicates the data as short message data.

When the satellite positioning module data in the short message communication data received by the vehicle-mounted ATP host are invalid, the data of active positioning are used as the integrity determination basis, reported to the ground device, and indicated as short message data and active positioning data.

When the ground device receives a train integrity report from the vehicle-mounted ATP host, in the case of short message data, the confidence interval of the train position and safe train length is appropriately widened, low-frequency movement authorization calculation is conducted, and a driving permit is issued to subsequent trains to ensure driving safety.

It should be noted that the train integrity detection method provided by the invention can be used as a main method for an unsafe train rear device, and can also be used as a backup method for a safe train rear device. Through short messages, information exchange between the vehicle-mounted ATP and the train rear device is realized, so that train integrity will not be lost due to the external environment, safe operation of subsequent trains is ensured, and transportation efficiency is improved.

The above are only specific embodiments of the invention, but the protection scope of the invention is not limited thereto. Any person familiar with the technical field can easily think of various equivalent modifications or substitutions within the technical scope disclosed by the invention, and these modifications or substitutions should fall within the protection scope of the invention. Therefore, the protection scope of the invention shall be subject to the protection scope of the claims.

What is claimed is:

1. A train integrity detection system based on Beidou short message communication, comprising:
    a vehicle-mounted Automatic Train Protection (ATP) host, and
    a train rear device and a ground Radio Block Center (RBC) device,
    wherein the vehicle-mounted ATP host communicates with both the train rear device and the ground RBC device, the vehicle-mounted ATP host and the train rear device each comprises a main control unit, a wind pressure detection module, a wireless communication module, and a speed measurement module and a satellite positioning module which are connected with the main control unit, and the vehicle-mounted ATP host and the train rear device also each comprises a Beidou short message communication module connected with the main control unit,
    wherein the Beidou short message module is added to the train rear device, which is used to realize train rear information transmission and position acquisition when two fault points, that is, the wireless communication module and the satellite positioning module, fail.

2. The train integrity detection system based on Beidou short message communication according to claim 1, wherein the Beidou short message communication module has functions of active positioning and short message communication, and is configured to realize the integration of positioning and communication.

3. The train integrity detection system based on Beidou short message communication according to claim 2, wherein the active positioning function of the Beidou short message communication module is realized by sending a positioning application signal to a Beidou short message satellite and then receiving positioning information returned by the satellite.

4. The train integrity detection system based on Beidou short message communication according to claim 3, wherein the active positioning function results in a high positioning speed, the positioning information is configured to be obtained within 3 seconds, and positioning accuracy is within 100 m.

5. The train integrity detection system based on Beidou short message communication according to claim 2, wherein the short message communication function of the Beidou short message communication module is configured to be used as a backup of the wireless communication module, and the active positioning function is configured to be used as a backup of the satellite positioning module.

6. The train integrity detection system based on Beidou short message communication according to claim 1, wherein when the wireless communication module is unavailable, the train rear device transmits data through a short message of the Beidou short message communication module.

7. The train integrity detection system based on Beidou short message communication according to claim 6, wherein when the short message data are used to determine whether a train is complete, a minimum safe rear end of the train is updated, a determination method adopted by the vehicle-mounted ATP host is configured to be different from that of using the wireless communication module, and reporting to the ground RBC device is needed.

8. The train integrity detection system based on Beidou short message communication according to claim 1, wherein the train rear device sends wireless communication data and short message data at the same time, together with active positioning and passive positioning data.

9. The train integrity detection system based on Beidou short message communication according to claim 8, wherein when a passive positioning error becomes larger, the vehicle-mounted ATP host compares the active positioning data with passive positioning, increases a threshold to determine whether a train is complete, and reports to the ground RBC device.

* * * * *